United States Patent
Fisher et al.

(10) Patent No.: US 9,303,575 B2
(45) Date of Patent: Apr. 5, 2016

(54) AUTOMATIC SET POINT ADJUSTMENT SYSTEM AND METHOD FOR ENGINE AIR-FUEL RATIO CONTROL SYSTEM

(71) Applicant: Continental Controls Corporation, San Diego, CA (US)

(72) Inventors: David Gordon Fisher, Carlsbad, CA (US); Richard Ross Fisher, San Marcos, CA (US); Galina Laur, San Diego, CA (US); Hillary H. Grimes, III, San Diego, CA (US); Kristian W. Yates, Valley Center, CA (US); John A. Zahir, San Diego, CA (US); John C. Vronay, La Jolla, CA (US)

(73) Assignee: CONTINENTAL CONTROLS CORPORATION, San Diego, CA (US)

( * ) Notice: Subject to any disclaimer, the term of this patent is extended or adjusted under 35 U.S.C. 154(b) by 823 days.

(21) Appl. No.: 13/629,329

(22) Filed: Sep. 27, 2012

(65) Prior Publication Data

US 2013/0074817 A1    Mar. 28, 2013

Related U.S. Application Data (60) Provisional application No. 61/540,108, filed on Sep. 28, 2011.

(51) Int. Cl.
*F02D 41/14* (2006.01)
*F02D 41/00* (2006.01)
(Continued)

(52) U.S. Cl.
CPC .......... *F02D 41/0027* (2013.01); *F02D 19/023* (2013.01); *F02D 41/1454* (2013.01);
(Continued)

(58) Field of Classification Search
CPC ............ F02D 41/1444; F02D 41/1455; F02D 41/1458; F02D 41/146; F02D 41/1461; F02D 41/1462; F02D 41/1463; F02D 41/1465; F02D 41/1473; F02D 41/1487
See application file for complete search history.

(56) References Cited

U.S. PATENT DOCUMENTS 4,364,356 A    12/1982   Gerhold
4,915,080 A    4/1990   Nakaniwa et al.
(Continued)

FOREIGN PATENT DOCUMENTS

DE     10014238 A1    9/2001
EP      1099844 A2    5/2001
WO    2008054588 A2    5/2008

OTHER PUBLICATIONS

International Search Report and Written Opinion for related application No. PCT/US2012/057537 dated Mar. 18, 2013, in 11 pages.
(Continued)

*Primary Examiner* — Erick Solis
(74) *Attorney, Agent, or Firm* — Procopio, Cory, Hargreaves & Savitch, LLP (57) ABSTRACT

Systems and methods for continuous automatic adjustment of a control set point of an air-fuel ratio controller of a rich burn engine so as to maintain emissions within a desired range. In an embodiment, a NOx sensor is placed in the exhaust outlet from an exhaust catalyst and the NOx exhaust sensor output is continuously monitored while adjusting the control set point between rich and lean in order to minimize the output from the NOx sensor. Corrections may be continuously made to the set point during operation of the engine to compensate for changes in environmental conditions, engine loads, and other factors.

18 Claims, 8 Drawing Sheets

(51) Int. Cl.
*F02D 41/26* (2006.01)
*F02M 21/02* (2006.01)
*F02D 19/02* (2006.01)

(52) U.S. Cl.
CPC ........ *F02D41/1463* (2013.01); *F02D 41/1465* (2013.01); *F02D 41/1482* (2013.01); *F02D 41/1483* (2013.01); *F02D 41/266* (2013.01); *F02M 21/0215* (2013.01); *F01N 2560/026* (2013.01); *F02D 41/1441* (2013.01); *Y02T 10/32* (2013.01)

(56) References Cited

U.S. PATENT DOCUMENTS

| | | | | |
|---|---|---|---|---|
| 6,363,715 | B1* | 4/2002 | Bidner | F02D 41/0235 60/274 |
| 8,005,603 | B2 | 8/2011 | Fisher et al. | |
| 2001/0032457 | A1* | 10/2001 | Ludwig | F01N 3/0842 60/285 |
| 2004/0139951 | A1 | 7/2004 | Fisher et al. | |
| 2004/0209734 | A1* | 10/2004 | Mitsutani | F02D 41/0295 477/111 |
| 2006/0096278 | A1* | 5/2006 | Lueders | F01N 3/208 60/286 |
| 2006/0107925 | A1 | 5/2006 | Bourn et al. | |
| 2009/0223499 | A1 | 9/2009 | Rosel | |
| 2013/0138326 | A1* | 5/2013 | Andersson | F02D 41/1461 701/103 |

OTHER PUBLICATIONS

Nuss-Warren et al. "Characterization of NSCR Performance on Four Stroke Natural Gas-Fueled Rich Burn Engines." Presented at the Gas Machinery Conference, Oct. 2008, 26 pages.

Cottrill. "Evaluation of Automotive Oxygen Sensors for Steady-State Air/Fuel Ratio Control and its OBD Characteristics on Natural Gas Engines." Presented at the 1999 ASME Spring Technical Conference, Apr. 24-28, 1999. Columbus, Indiana. ASME paper No. 99-ICE-173. 10 pages.

Andersson. "Three Way Catalyst Control using PI-style Controller with HEGO Sensor Feedback." Department of Vehicular Systems, Linkoping University, Sweden. 6 pages. 2002.

Amadu et al. "Operating Characteristics of an NSCR Catalyst on an 80 kW Cummins-Onan Gensrt." Presented at the 2008 Gas Machinery Conference, Albuquerque, New Mexico. 14 pages.

Vronay et al. "Task 2.4 Sensor Screening Test Report / Task 5 Emission System Test Plan & Emission System Development Report." Prepared by Southern California Gas Company for California Energy Commission. Pier Project Task Report. Commission Contract No. PIR-07-008. Oct. 2010. 54 pages.

Gardiner. "Misfire Detection for Spark Ignition Engines Based Upon Cycle-by-Cycle Exhaust Temperature Sensing." Presented at the ASME 2010 Internal Combustion Engine Division Fall Technical Conference, Sep. 12-15, 2010, San Antonio, Texas. ASME Paper No. ICEF2010-35153. 10 pages.

Gardiner et al. "Cycle-by-Cycle Exhaust Temperature Monitoring for Detection of Misfiring and Combustion Instability in Reciprocating Engines." Proceedings of the ASME Internal Combustion Engine Division 2007 Fall Technical Conference Paper No. ICEF2007. Oct. 14-17, 2007, Charleston, South Carolina. ASME Paper No. ICEF2007-1740. 6 pages.

ECOM America. ECOM J2KN Portable Analyzer: Operation Manual. 24 pages. Exact date of manual unknown, but prior to this application. ECOM-J2KN product is listed on www.ecomus.com products web page posted at least as early as Aug. 2006.

Extended European Search Report for European Patent Application No. 12834771.3 mailed on Dec. 8, 2015, in 8 pages.

\* cited by examiner

AUTOMATIC SET POINT ADJUSTMENT SYSTEM AND METHOD FOR ENGINE AIR-FUEL RATIO CONTROL SYSTEM

PRIORITY

This application claims priority to U.S. Provisional Patent App. No. 61/540,108, filed Sep. 28, 2011, and titled "Automatic Set Point Adjustment System and Method for Engine Air-Fuel Ratio Control System," the entirety of which is hereby incorporated herein by reference.

This invention was made with support from the State of California under California Energy Commission Grant No. PIR-07-008. The California Energy Commission has certain rights in the invention.

BACKGROUND

1. Field of the Invention

The present invention relates generally to air-fuel ratio (AFR) controllers or electronic carburetors for engines that operate at stoichiometric or near-stoichiometric air-fuel ratios, also known as "rich burn" engines, and particularly to providing dynamic feedback to the AFR controller to automatically achieve the optimum set point to improve or maximize the effectiveness of a three-way (NSCR) catalyst as it relates to emissions reductions.

2. Related Art

Rich burn gaseous-fueled engines are thought to be a relatively clean and efficient source for power generation, oil and gas compression, water pumps—and even more increasingly with compressed natural gas (CNG), liquefied natural gas (LNG) or propane-fueled engines for cars and trucks. By adding a Non-Selective Catalytic Reduction (NSCR), also known as a three-way catalyst, along with a more sophisticated air-fuel ratio (AFR) control system, such as the control system for an electronic carburetor of Continental Controls Corporation of San Diego, Calif., described in U.S. Pat. No. 8,005,603, which is hereby incorporated herein by reference, non-desirable emissions of NOx (various oxides of nitrogen), CO, and Non-Methane Hydrocarbons can be reduced to what are considered acceptable levels. As the requirements for these "acceptable" levels of emissions continue to become more and more demanding, the window of control for these control systems becomes smaller and smaller.

In AFR controllers for running engines at stoichiometric air-fuel ratios, or rich burn engines, various methods of changing the ratio of the air and fuel mix are generally based on input from a pre-catalyst lambda sensor or oxygen sensor. This input tells the AFR controller when to add or subtract fuel. There is a narrow emissions control window or range within which the engine meets emission requirements. This window is sometimes referred to as the NSCR control window. This control can be satisfactorily maintained if the engine remains in a perfect environment with no changes in operating conditions. However, in practice, the ability to control an engines air-fuel ratio within this window is affected by drift of the oxygen sensors used to provide feedback to the AFR control, aging of the NSCR catalyst elements, temperature of the catalyst and the exhaust gas from the engine, changes in back pressure on the catalyst, and/or many other variables.

As the target for emissions compliance continues to be reduced, the NSCR control window becomes smaller, and maintaining control becomes more and more difficult. If an AFR controller moves the air-fuel ratio to the rich side of the window, carbon monoxide and ammonia levels increase. If the AFR controller moves the air-fuel ratio to the lean side of the window, NOx goes higher. To establish the correct set point, the standard procedure is to run the engine at a given load, monitor the exhaust for these emissions with an exhaust gas analyzer, and note the point where NOx and CO are both within the window of compliance. At that point, the oxygen sensor, in the exhaust output after the catalyst, is measured for the voltage at the optimum control point. That voltage then becomes the desired set point.

The problem with existing AFR controllers for rich burn gaseous-fuel engines is that the properties of the sensors, catalyst, and even ambient temperatures change, such that the desired set point needs to change. Currently, in order to continue to maintain the window of control for low emission systems, a technician must check the engine with an emissions analyzer and re-establish the proper oxygen sensor set point at frequent intervals.

NOx sensors have recently become commercially available, and they hold great promise for helping with emissions control in the future. They are already being widely used on lean burn gas engines and diesel engines (which also run in a lean mode). The problem has been that, when used for measuring NOx for rich burn engines with an NSCR catalyst, the sensor can read NOx, but has a cross-sensitivity to ammonia or $NH_3$. This sensitivity, along with the very noisy signal generated from NOx sensors on a rich burn engine, has made the use of NOx sensors for emissions control of rich burn engines difficult.

SUMMARY

Embodiments described herein provide for a system and method for automatically controlling the oxygen sensor set point of an AFR controller of a rich burn engine to maintain the set point at or close to the optimum level.

According to one aspect, a method is provided for continuous automatic adjustment of a control set point of an AFR controller of a rich burn engine so as to maintain emissions within a desired range. A NOx sensor is placed in the exhaust outlet from an exhaust catalyst, and the NOx exhaust sensor output is continuously monitored while adjusting the control set point between rich and lean in order to minimize the output from the NOx sensor. Corrections are continuously made to the set point during operation of the engine to compensate for changes in environmental conditions, engine loads, and other factors.

Once the AFR controller is adjusted so that the NOx output is at or close to a minimum value, the NOx output continues to be monitored in order to detect increases in NOx output due to changes in engine conditions. The AFR is adjusted between rich and lean, so that the system tends to return to or move towards the minimum NOx output condition. In other words, the NOx output is monitored continuously and the AFR controller receives a control input from a NOx output monitoring controller so as to vary the AFR in a direction towards the NOx minimum value in response to increases in the NOx sensor output, whether due to detected increases in NOx or ammonia. Thus, the sensitivity of the NOx sensor to both overly rich pre-catalyst conditions (i.e., high post-catalyst $NH_3$) and too lean pre-catalyst conditions (i.e., high NOx) can be exploited in a minimization algorithm.

In one embodiment, the set point of a lambda or oxygen sensor, used by an existing AFR controller in order to set the air-fuel ratio, is adjusted by incremental amounts or trim steps so as to vary the air-fuel ratio. In one embodiment, the oxygen sensor set point is adjusted in a first direction (either in a richer or leaner air-fuel ratio direction) by a predetermined trim amount. The output of a NOx sensor in the engine exhaust is monitored for a predetermined time period, and the average NOx output over the monitored time period is calculated and saved as the current average NOx output. The engine air-fuel ratio is adjusted in the first direction by the trim amount at the end of the monitoring time period. The NOx sensor output is then monitored for a predetermined time period after adjustment, and the average NOx output is calculated and compared to the previously saved average NOx output. If the new average is less than the previously saved average, the set point is again adjusted by the trim amount in the same, first direction, before monitoring NOx output again and repeating the process. If, on the other hand, the new average NOx output is greater than the previous average NOx output, the trim direction is reversed before adjusting the sensor set point. In other words, if the first direction was towards lean, the sensor set point is adjusted in a second direction to move the air-fuel ratio towards rich. However, if the first direction was towards rich, the sensor set point is adjusted in a second direction to move the air-fuel ratio towards lean. Each new average NOx output is saved for comparison with the next average NOx output at the end of the next monitored time period.

In one example, the control set point which is adjusted may be the oxygen sensor set point. The oxygen set point trim is adjusted in small steps towards rich or lean at regular intervals, and the direction is determined by feedback from the NOx sensor. During each interval, the NOx sensor feedback is averaged and compared to the NOx average of the previous interval. If the average NOx value increases from the previous average NOx value, the trim switches direction (if it was marching toward the rich direction, it switches to marching toward the lean direction, and vice versa). By adding a NOx sensor after the NSCR catalyst and modifying the engine air-fuel ratio to either rich or lean in an attempt to minimize the NOx sensor output, the control set point for minimum emissions can be achieved automatically without human intervention. As the engine moves towards lean, the NOx output increases, which increases the voltage returned from the NOx sensor. As the fuel mixture becomes richer, the NOx sensor senses $NH_3$, and again the voltage increases. By continuously controlling the air-fuel ratio of the engine to minimize the voltage output from the NOx sensor, an optimum or close to optimum control set point, for minimum NOx, CO, and HC emissions from the NSCR catalyst, can be automatically achieved and maintained over time as conditions, loads, and other factors are changing. This provides automatic set point control for the air-fuel ratio of a rich burn engine, without human intervention, by using dynamic feedback from the NOx sensor.

According to another aspect, a system for automatically adjusting a sensor set point for an AFR controller of a gaseous-fueled, rich burn engine comprises a NOx sensor configured for positioning in the exhaust output of an engine exhaust catalyst, particularly a non-selective catalyst, a NOx sensor output monitoring module connected to the NOx sensor output which is configured to monitor the NOx sensor output for predetermined time intervals and calculate an average NOx sensor output for each successive monitored time interval, a data storage module connected to the monitoring module and configured to save each average NOx sensor output, a sensor set point trim adjustment module configured to adjust the sensor set point of the AFR controller by a predetermined step amount in a first direction or a second direction at the end of each monitoring time interval, one of the directions being towards lean and the other direction being towards rich, and a sensor set point trim processor module which is configured to compare each new average NOx sensor output with the previously saved average NOx sensor output and to change the trim direction of the sensor set point trim adjustment module if the new average is greater than the previously saved average.

In a further embodiment, a system for automatically adjusting a sensor set point is disclosed. The system comprises an adjustment controller configured to be communicatively connected to a nitrogen oxides (NOx) sensor and an air-fuel-ratio (AFR) controller, wherein the adjustment controller comprises: at least one hardware processor; and one or more modules that receive NOx sensor output from the NOx sensor, compare a measure of current NOx sensor output to a measure of prior NOx sensor output, and adjust a set point of the AFR controller based on the comparison.

In an additional embodiment, a method for automatically adjusting a sensor set point is disclosed. The method comprises, by at least one hardware processor: receiving NOx sensor output from a nitrogen oxides (NOx) sensor; comparing a measure of current NOx sensor output to a measure of prior NOx sensor output; and adjusting a set point of a air-fuel ratio (AFR) controller based on the comparison.

These methods and systems for automatically adjusting an air-fuel ratio control set point may be used with any AFR controller which uses an oxygen or other gaseous sensor output as a control input, and for any gaseous-fueled engines including Natural Gas, Compressed Natural Gas (CNG), Liquified Natural Gas (LNG), Bio Gas, Propane engines, or any other gaseous-fueled engine, and for both stationary engines, such as industrial natural gas engines used in the electricity, water, and manufacturing industries, and vehicle engines. Vehicle engines have continually changing loads and other conditions requiring more frequent set point adjustment, and greater reduction in emissions may therefore be achieved with an automatic controller which continuously adjusts the set point.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments disclosed herein provide for systems, devices, and methods for using a NOx (oxides of nitrogen) sensor to provide dynamic feedback to an air-fuel ratio control system of a gaseous-fuel engine, so as to establish and maintain an optimum or close to optimum sensor set point for the control system, in order to maintain emissions within a desired range.

After reading this description it will become apparent to one skilled in the art how to implement the invention in various alternative embodiments and alternative applications. Although various embodiments will be described herein, it is understood that these embodiments are presented by way of example only, and not limitation. As such, this detailed description of various alternative embodiments should not be construed to limit the scope or breadth of the present invention.

FIGS. 1 to 4 illustrate embodiments of an automatic set point adjustment system 10 and method for the air-fuel ratio (AFR) controller 12 of a rich burn gaseous-fueled engine 14. Such engines are typically used in power generating plants, oil and gas compression, water pumps, and the like, and also for compressed natural gas (CNG), liquified natural gas (LNG), bio gas, and propane engines for cars and trucks. The automatic set point adjustment system described herein may be used together with AFR controllers of any such engines.

Figure 1:
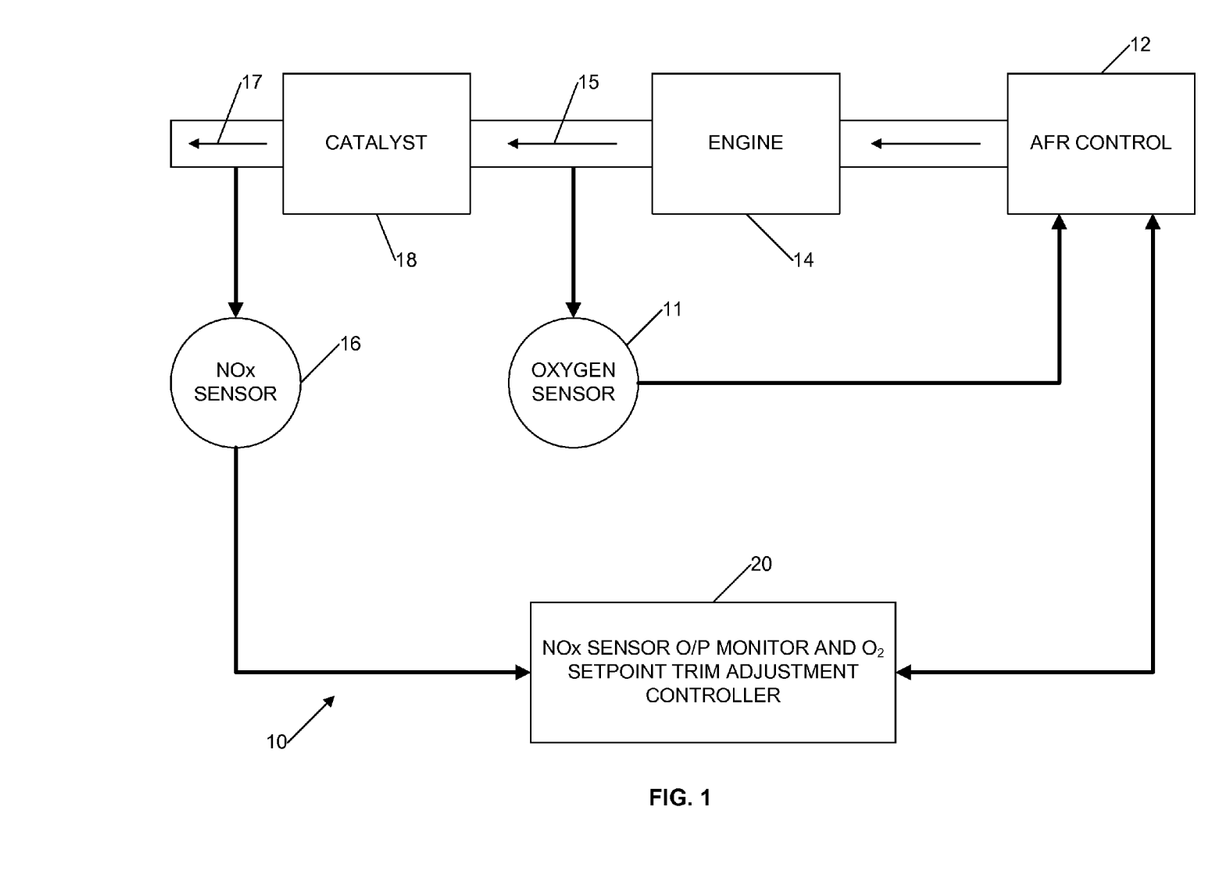
FIG. 1 is a block diagram illustrating an automatic set point adjustment system for an air fuel ratio controller in a rich burn gaseous fuel engine, according to an embodiment.

As illustrated in FIG. 1, the AFR controller 12 may have a control input from pre-catalyst oxygen sensor 11 in a first feedback control loop between engine exhaust outlet 15 and AFR controller 12. The AFR controller may be any standard air-fuel ratio control system using an oxygen sensor set point for varying the fuel pressure or air-fuel ratio, such as the EGC2 and EGC4 electronic gas carburetors and the ECV 5 control system for gas engines, as sold by Continental Controls Corporation of San Diego, Calif. One such air-fuel ratio control system and method is described in U.S. Pat. No. 8,005,603 of Fisher et al. which issued on Aug. 23, 2011, the contents of which are incorporated herein by reference. In these systems, the pre-catalyst oxygen sensor feedback to the AFR controller is compared to the oxygen or $O_2$ set point, and the difference is used in controlling the air-fuel ratio to produce an oxygen sensor output to match the $O_2$ set point.

As illustrated in FIG. 1, the set point adjustment system 10 may be connected in a second feedback loop to the AFR controller 12. The set point adjustment system 10 may comprise a post-catalyst NOx sensor 16 which is placed in the exhaust outlet 17 of an exhaust catalyst 18 in the outlet path from engine 14. The system 10 may also comprise a NOx sensor output monitor and trim adjustment controller 20 which monitors the output of NOx sensor 16 for successive monitoring time intervals, and applies a trim adjustment step to vary or "dither" the oxygen sensor set point of the AFR control system by a predetermined step amount at the end of each monitored time interval, as described in more detail below with reference to FIGS. 3 and 4. Catalyst 18 is typically a non-selective catalyst or NSCR, also known as a three-way catalyst. The oxygen set point trim value, as determined by controller 20, is configured to bias the AFR controller's oxygen set point either richer or leaner, to minimize the post-catalyst NOx sensor input to the controller 20, as described in more detail below.

It is known that an NSCR catalyst, along with an air-fuel ratio control system, can reduce non-desirable emissions of NOx, CO, and non-methane hydrocarbons to acceptable levels. However, as the requirements for acceptable emission levels continue to become more and more demanding, the window of control for AFR control systems becomes smaller and smaller, and it is only possible to satisfactorily maintain emissions within the narrow window of acceptable levels using current control systems if there is no change in engine operating conditions. The ability to control the air-fuel ratio of an engine within this window is affected by drift of the oxygen sensors used to provide feedback to the AFR controller, aging of the NSCR catalyst elements, temperature changes in the catalyst and exhaust gases, changes in catalyst back pressure, as well as other potential factors.

It is difficult to maintain exhaust gas levels within the desired window, because when an engine runs more rich, carbon monoxide and ammonia levels become higher, while NOx levels become higher when the engine runs more lean. The current standard procedure to establish the correct AFR controller set point is to run the engine at a given load, monitor the exhaust for these emissions with an exhaust gas analyzer while varying AFR, and note the point where both NOx and CO are within the window of compliance. At that point, an oxygen sensor that is in the exhaust is measured for the voltage at the optimum control point. This then becomes the new set point for the AFR controller. The problem with this procedure is that the properties of the sensors, catalyst, and even ambient temperatures are constantly changing, so that the desired set point needs to change. In the current standard procedure, a technician has to re-check the engine with an emissions analyzer frequently, and repeatedly re-establish the proper oxygen sensor set point. This is not ideal, and requires significant technician time and expense.

The automatic set point adjustment systems and methods disclosed herein overcome these problems by continuous, automatic adjustment of the oxygen sensor set point. This may be understood with reference to FIG. 2, which illustrates the variation in the output of a NOx sensor, such as sensor 16 of FIG. 1, with operating conditions Φ, as an engine is run between rich and lean and the exhaust gases change from higher ammonia (rich side of the curve in FIG. 2) to higher NOx (lean side of the curve in FIG. 2).

Figure 2:
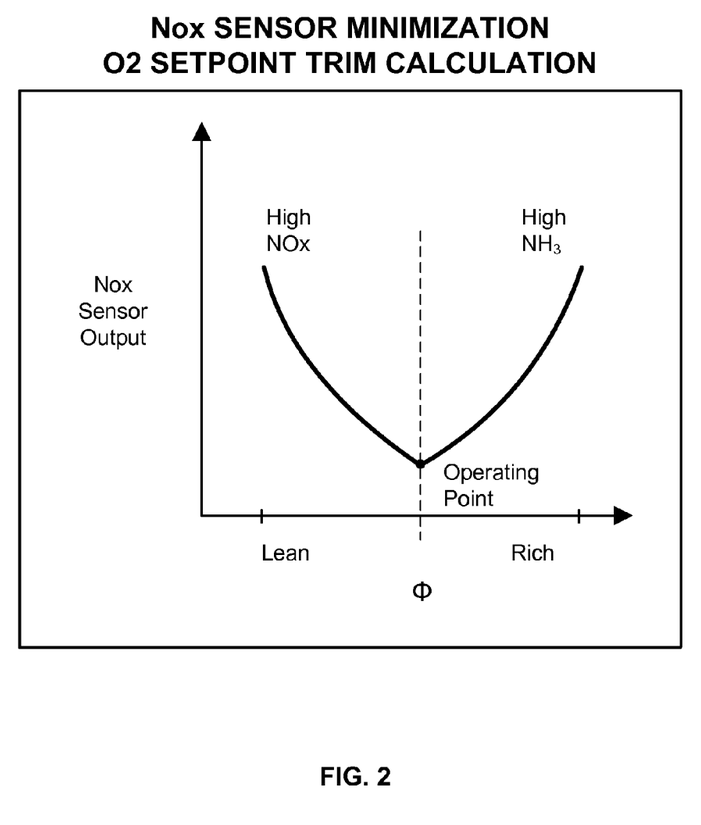
FIG. 2 is a graph illustrating variations in NOx sensor output with engine air-fuel ratio.

According to an embodiment, the disclosed systems and methods exploit what many researchers have identified as a limitation to the use of NOx sensors on stochiometric engines. Specifically, such researchers have identified that NOx sensors are sensitive to both NOx and ammonia. However, since high levels of NOx are indicative of a lean pre-catalyst condition, and high levels of ammonia are indicative of a rich pre-catalyst condition, this perceived weakness of NOx sensors can be exploited in a minimization algorithm or process, as described herein. A NOx sensor will respond with a higher output signal in response to increases in levels of either NOx or ammonia, as indicated in FIG. 2. In this graph, $\Phi = AF_{stoic}/AF_{act}$, where $AF_{stoic}$ is the mass-based stoichiometric air-fuel ratio, and $AF_{act}$ is the mass-based actual air-fuel ratio. The automatic set point adjustment system varies the air-fuel ratio while monitoring the output of the NOx sensor to locate the minimum point on the curve of FIG. 2, since, as discussed above, the NOx sensor responds to both NOx and ammonia as indicated in FIG. 2. Exploitation of this feature of NOx sensors can advantageously eliminate the need for calibrating the NOx sensor or any other type of sensor mapping.

In addition, the amount of bias that the NOx sensor can exert may be bounded. By bounding the amount of bias that the NOx sensor may exert, the catalyst monitoring component of an AFR controller can generate an alarm if a control signal calling for excessively rich or lean operation is detected. Such an alarm can alert the system and/or an operator of the system about the presence of conditions that have led to the control signal, such as a misfire.

As noted above, the AFR controller has an oxygen sensor set point and may adjust the air-fuel ratio based on the difference between detected oxygen sensor output and the oxygen sensor set point. The controller or control system 20 of FIG. 1 may be configured to adjust the oxygen sensor set point as needed to maintain the NOx sensor output at or close to a minimum value that corresponds to the minimum point between higher ammonia (rich burn) and higher NOx (lean burn) in the curve of FIG. 2. Controlled variation or dithering of $O_2$ set point produces changes in the NOx sensor output, which in turn allows the direction of the $O_2$ set point adjustment to be controlled so that NOx sensor output is biased towards a minimum value, i.e., the value at point Φ in FIG. 2.

Figure 3:
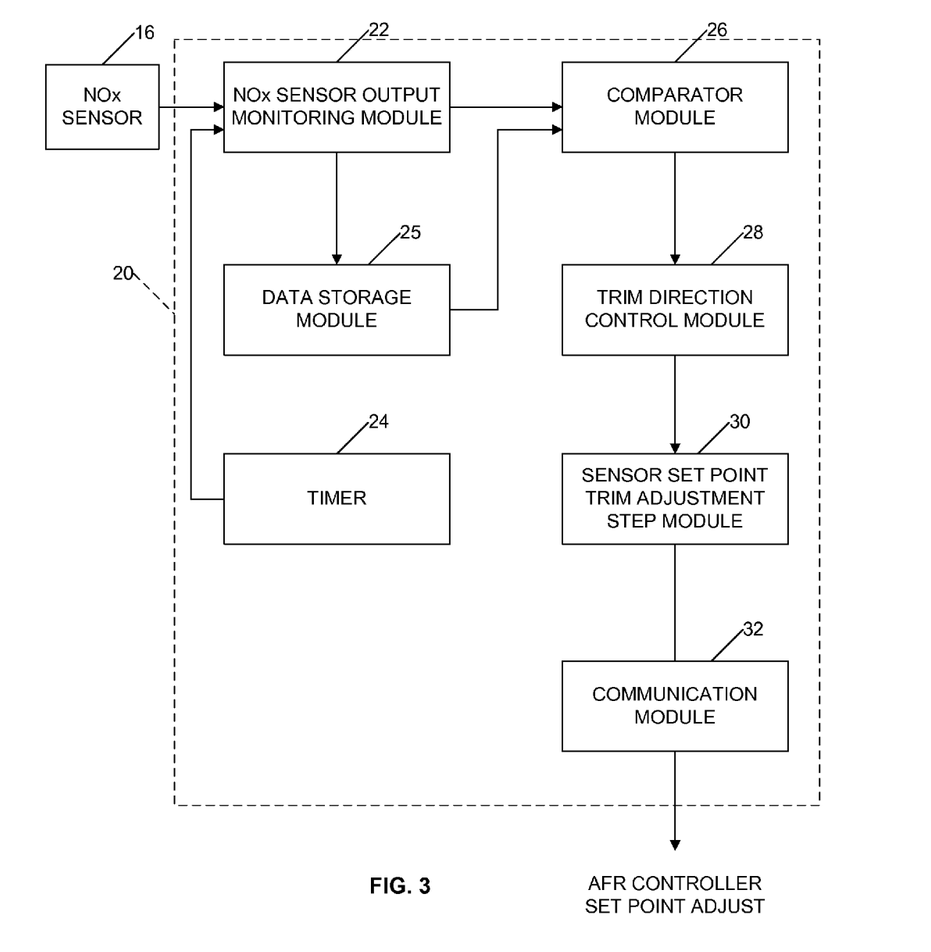
FIG. 3 is a block diagram of a trim step adjustment controller (e.g., of FIG. 1), according to an embodiment.
Figure 4:
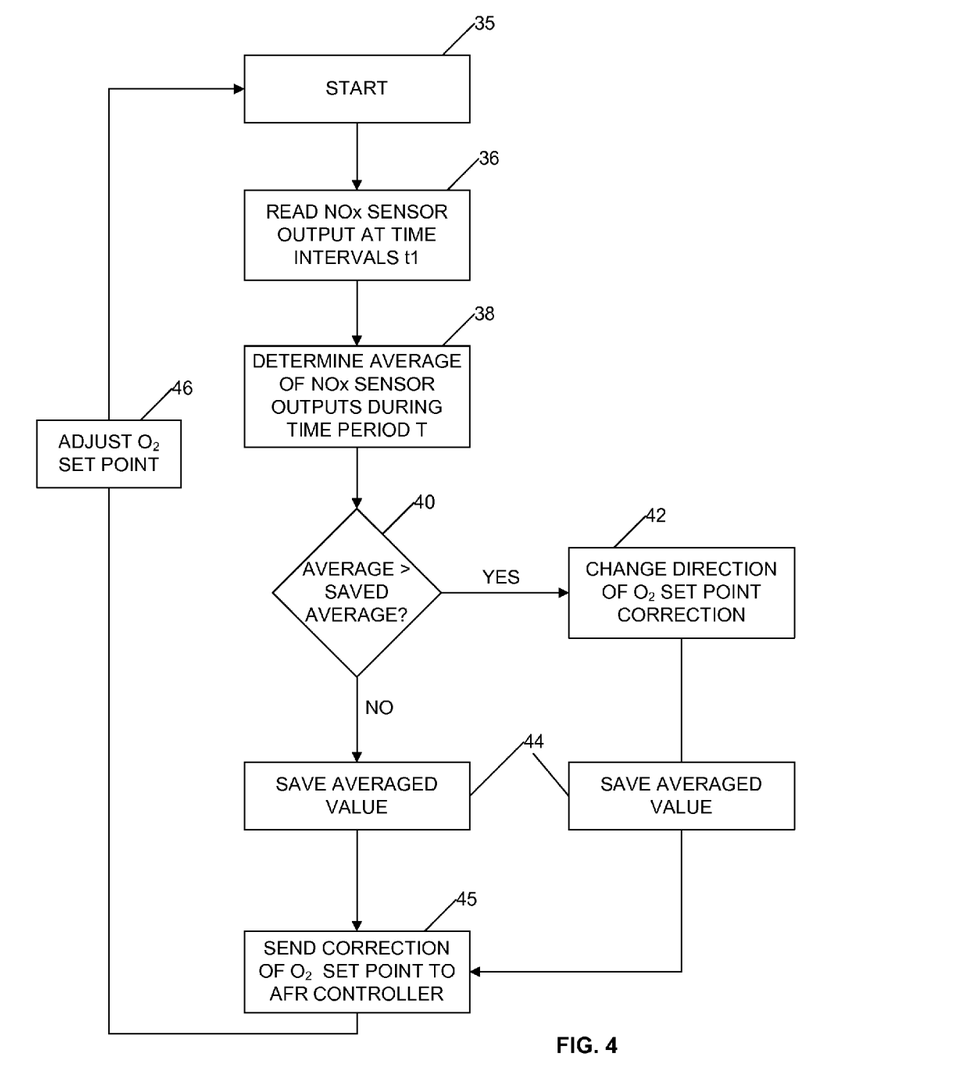
FIG. 4 is a flow diagram illustrating a method of adjusting the oxygen sensor set point of an AFR controller based on exhaust NOx sensor output, according to an embodiment.

The automatic set point adjustment system and method of one embodiment are illustrated in more detail in FIGS. 3 and 4. As illustrated in FIG. 3, the controller or control system 20 of FIG. 1 may include a NOx sensor output monitoring module 22 which reads the output of NOx exhaust sensor 16 at predetermined short intervals over a selected time period, and determines an average value of the sensor output readings over the selected time period as controlled by timer 24. The controller or control system 20 may further include a data storage module 25 which stores the latest NOx sensor output average value, and a comparator module 26 which receives the latest NOx sensor output average value from monitoring (and averaging) module 22 and compares that value with the previous average value stored in data storage module 25. A trim direction control module 28 controls the direction of a stepwise adjustment of an oxygen sensor set point, and a sensor set point trim adjustment module 30 sends a control signal to the AFR controller 12 via communication module 32. Trim direction control module 28 and trim step adjustment module 30 control the amount and direction of the adjustment of the AFR controller oxygen sensor set point, as illustrated in more detail in FIG. 4, which is a flow diagram illustrating the steps carried out by system 20.

The automatic set point adjustment method of this embodiment involves varying the air-fuel ratio between rich and lean by adjusting or dithering the oxygen sensor control point of the AFR controller in a direction tending to move the NOx sensor output towards the minimum value, as demonstrated, for example, in FIG. 2. Referring to FIG. 1, the AFR controller has a conventional Lambda feedback control loop in which AFR is varied at predetermined time intervals t1 based on a comparison between oxygen sensor output and the oxygen sensor set point. The NOx sensor signal minimization loop, which is the outer loop from the NOx sensor to the AFR controller in FIG. 1, is controlled to correct the lambda or oxygen sensor set point based on NOx sensor output at predetermined time intervals as controlled by timer 24 of FIG. 3, with the time intervals for the NOx sensor loop being longer than the time interval of the oxygen sensor feedback loop.

As illustrated in FIG. 4, after start up of the engine (step 35), the NOx sensor output monitoring module 22 reads the NOx sensor output at predetermined time intervals t1 for a selected time period T (step 36). Each NOx sensor output reading is saved, and an average of all accumulated readings during time period T is calculated (step 38). In one embodiment, time intervals t1 were 50 milliseconds, and the readings were averaged over a time period T of five minutes. However, different values of t1 and T may be used in other embodiments. After expiry of time period T, the newly calculated average of NOx sensor output is compared to the previously saved average (step 40). If the new average is greater than the previously saved average, (i.e. the NOx sensor output is increasing, indicating that the NOx or ammonia level is increasing (see FIG. 2)), the direction of the oxygen set point correction or step adjustment is reversed (step 42) via the trim direction control module 28. If the new average is less than the previously saved average, this means the NOx sensor output is decreasing so the oxygen sensor set point adjustment is going in the correct direction. Accordingly, the direction of the adjustment is not changed. Regardless of whether the direction is changed or not, the new average value is saved (step 44), and the correction of the oxygen set point value is sent to the AFR controller 12 (step 45). The oxygen set point is then adjusted up or down (step 46), and the system continues to read the NOx sensor output repeatedly at each time interval t1 for the next time period T (step 36). The process is repeated to determine the next oxygen set point adjustment.

The trim step adjustment module 30 is arranged to vary the oxygen sensor set point of the AFR controller 12 by a predetermined amount or step in either the rich or lean direction (depending on the output of comparator module 26 at step 40 of the flow diagram of FIG. 4), depending on which direction tends to reduce the NOx sensor output. In one embodiment, each step adjustment amount is equivalent to 0.0001 Lambda (where Lambda=1 is the stoichiometric mixture), but different adjustment amounts may be used in other embodiments. Thus, the set point adjustment module 30 is designed to repeatedly increment or decrement the oxygen sensor set point of the AFR controller by an oxygen sensor trim amount or value, based on the detected average of readings of the NOx sensor output over successive time periods T.

The direction of the incremental adjustments in the oxygen set point is determined by the NOx sensor output value. For example, if the previous adjustment was towards the rich direction (i.e., the oxygen set point value is increasing), and the latest saved average of the NOx sensor outputs is smaller than the previously saved value, there is no need to change direction, because the NOx sensor output is heading towards the minimum value in FIG. 2. The oxygen set point is therefore increased by the predetermined adjustment amount or step. If the latest saved average is greater than the previously saved average, the adjustment direction is reversed (see step 42 of FIG. 4), and the oxygen set point value is decreased by the predetermined adjustment amount, i.e., the adjustment is towards lean. If the previous adjustment was toward lean (i.e., the oxygen set point was decreased in the previous step adjustment), and the latest saved average is less than the previous saved average, the next adjustment is in the same direction, and the oxygen sensor set point value is again decreased by the predetermined adjustment amount or step. If the latest saved average is greater than the previous saved average, this means that the NOx sensor output is moving up the lean side of the graph of FIG. 2 and away from the minimum value, so the adjustment direction is reversed, and the oxygen set point of the AFR controller is then increased by the predetermined adjustment amount. Thus, the $O_2$ trim "marches" in small steps towards rich or lean at regular intervals, and the direction is determined by feedback from the NOx sensor. During each interval, the NOx sensor feedback is averaged and compared to the NOx average for the previous interval. If the average NOx value increases from the previous average NOx value, the $O_2$ trim switches direction (if it was marching toward the rich direction, it switches to marching toward the lean direction, and vice versa).

Figure 5:
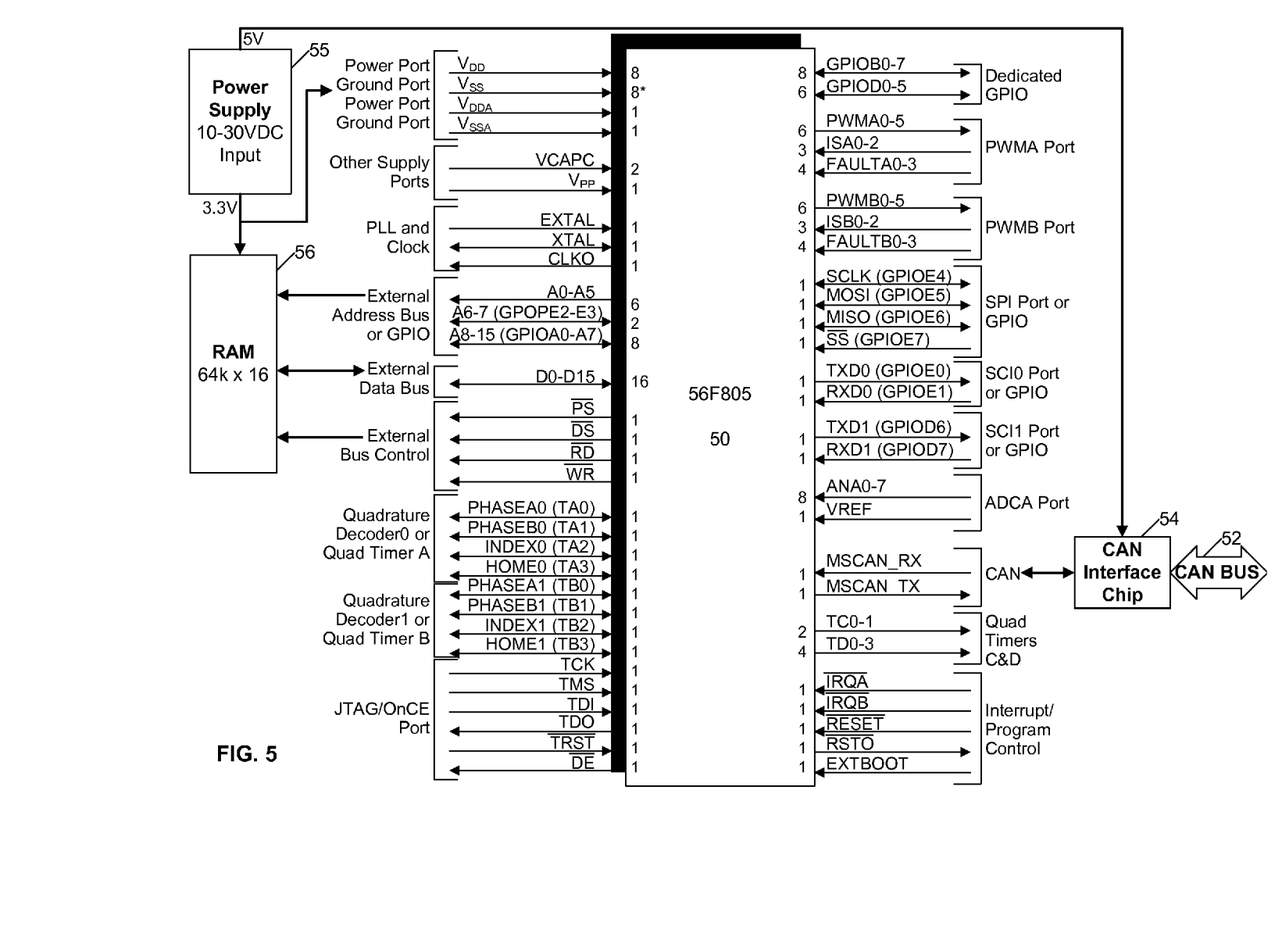
FIG. 5 is a schematic of an electronic-chip-based trim step adjustment controller, according to an embodiment.

It will be understood that the oxygen sensor set point adjustment controller 20 may be implemented using hardware, software, or a combination of both hardware and software. FIG. 5 illustrates one embodiment of a hardware based system 20E in which functions and steps of FIGS. 3 and 4 are carried out by a chip-based processor 50, such as a 56F805 chip. Processor 50 receives the input from NOx sensor 16 and provides the oxygen sensor set point trim output to AFR controller 12 via a controller area network (CAN) bus 52 and CAN interface chip 54. A suitable power supply 55 for chips 50 and 54 may be provided, and a data storage module in the form of RAM (random access memory) module 56 may be associated with chip-based processor 50. In an alternative embodiment, the functional modules of FIG. 3 may be provided by a suitably programmed central processing unit or computer. Although the oxygen sensor setpoint is adjusted in the embodiments described herein, it will be understood that other engine setpoints may be adjusted based on detected NOx sensor output in a similar manner in alternative embodiments, such as the differential pressure setpoint 370.

Figure 6:
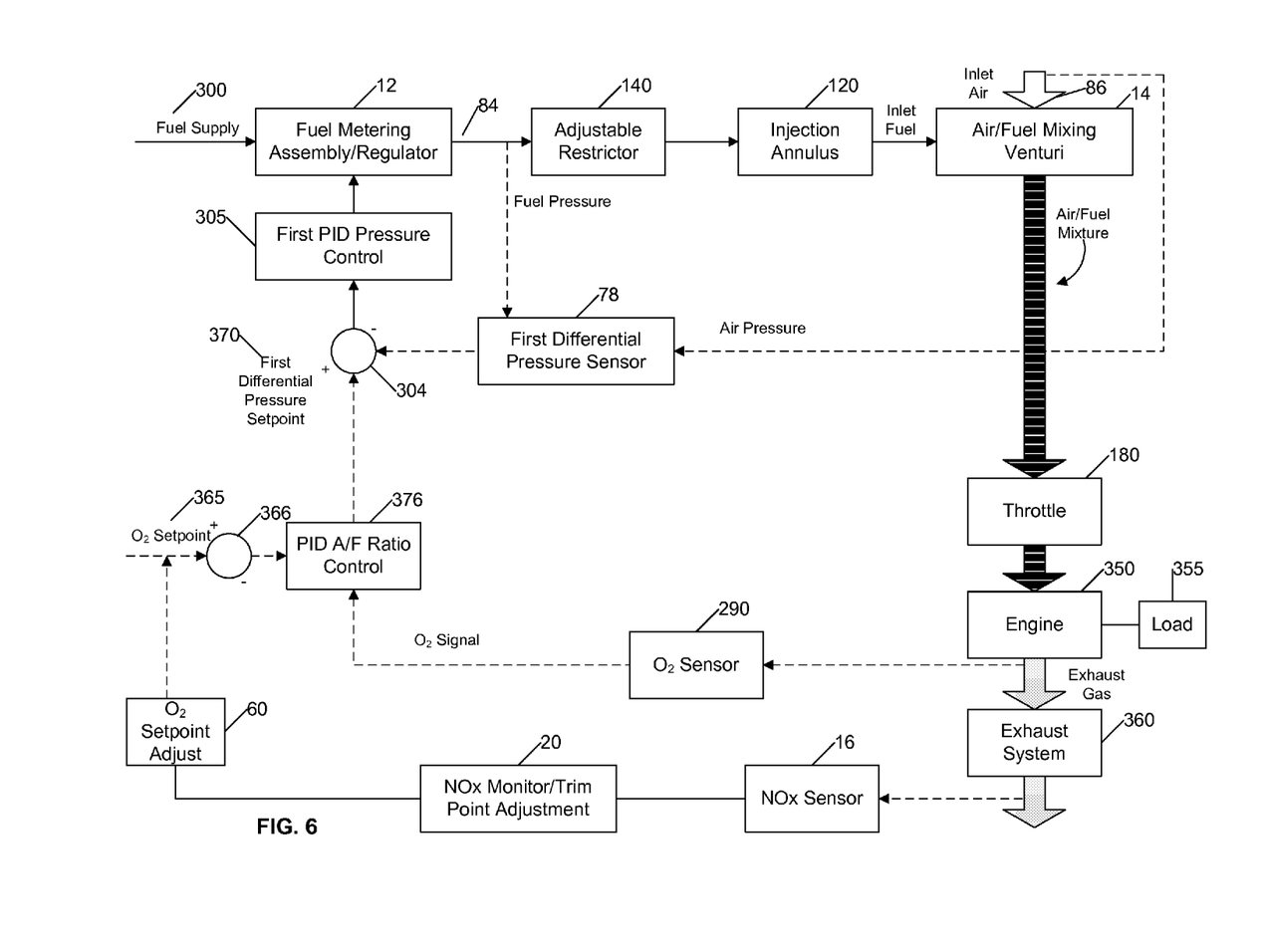
FIG. 6 is a detailed block diagram of an air-fuel ratio control system of an engine incorporating automatic oxygen sensor set point adjustment (e.g., using the system and method illustrated in FIGS. 3 and 4), according to an embodiment.

As noted above, the oxygen sensor set point adjustment systems and methods disclosed herein may be used for continuous set point adjustment of any AFR controller used to control air-fuel ratio for a gaseous-fuel, rich burn engine, thereby avoiding the need for repeated manual adjustment by a technician to maintain the engine within acceptable emissions levels. FIG. 6 illustrates one possible embodiment in which the oxygen sensor set point adjustment system is integrated with the air-fuel control system described in U.S. Pat. No. 8,005,603, referenced above and incorporated herein by reference. In the AFR control system for engine 350, as illustrated in FIG. 6, air enters the venturi mixer 14 (e.g., from the top). The air flowing through the throat of the venturi causes a reduced pressure in the area where the metering holes admit the fuel gas. The reduced pressure draws in a proportionate amount of fuel gas, which is thoroughly mixed with the air. The fuel-air mixture is admitted to the intake manifold of the engine 350 via a throttle assembly 180 and burned in the cylinders as they fire. A first differential pressure sensor or gas injection pressure sensor 78 integral to the EGC detects fuel or gas injection pressure in a primary control loop, and has an output connected to comparator 304, where detected pressure is compared to final injection pressure set point 370.

At the same time, pre-catalyst oxygen sensor 290, located in the exhaust system 360, monitors the amount of oxygen present. The output of the oxygen sensor is connected to the control assembly, and the measured oxygen is compared to oxygen set point 365 at comparator 366. The error signal or difference between the oxygen sensor output and oxygen set point is acted on by PID air/fuel ratio controller 376. The output of pressure set point or air-fuel ratio control module 376 modulates the first differential pressure set point or fuel injection pressure set point 370. Hence, the $O_2$ sensor 290, together with the oxygen set point 365, control how much fuel is added to the air stream in a closed loop manner.

Fuel is supplied from fuel supply 300 via the fuel metering assembly or regulator 12, annulus 84, and adjustable restrictor 140 to the injection annulus 120 of the air/fuel mixing venturi 14, while air is supplied to the venturi via the air inlet 86.

In the modified AFR control system of FIG. 6, the $O_2$ set point 365 of the AFR controller is compared with the output of pre-catalyst $O_2$ sensor 290 and used to control the first differential pressure set point 370, thereby adjusting the air-fuel ratio. Meanwhile, the output of post-catalyst NOx sensor 16 is simultaneously monitored by $O_2$ trim step adjustment controller 20 and used to determine an oxygen set point adjustment amount 60 which is added or subtracted from a current or previous oxygen set point 365, e.g., according to the flow diagram of FIG. 4. This provides automatic and continuous adjustment of the oxygen set point in the AFR control system to compensate for changing conditions of the engine or other components of the system, such as oxygen sensor drift and other variables.

Figure 7:
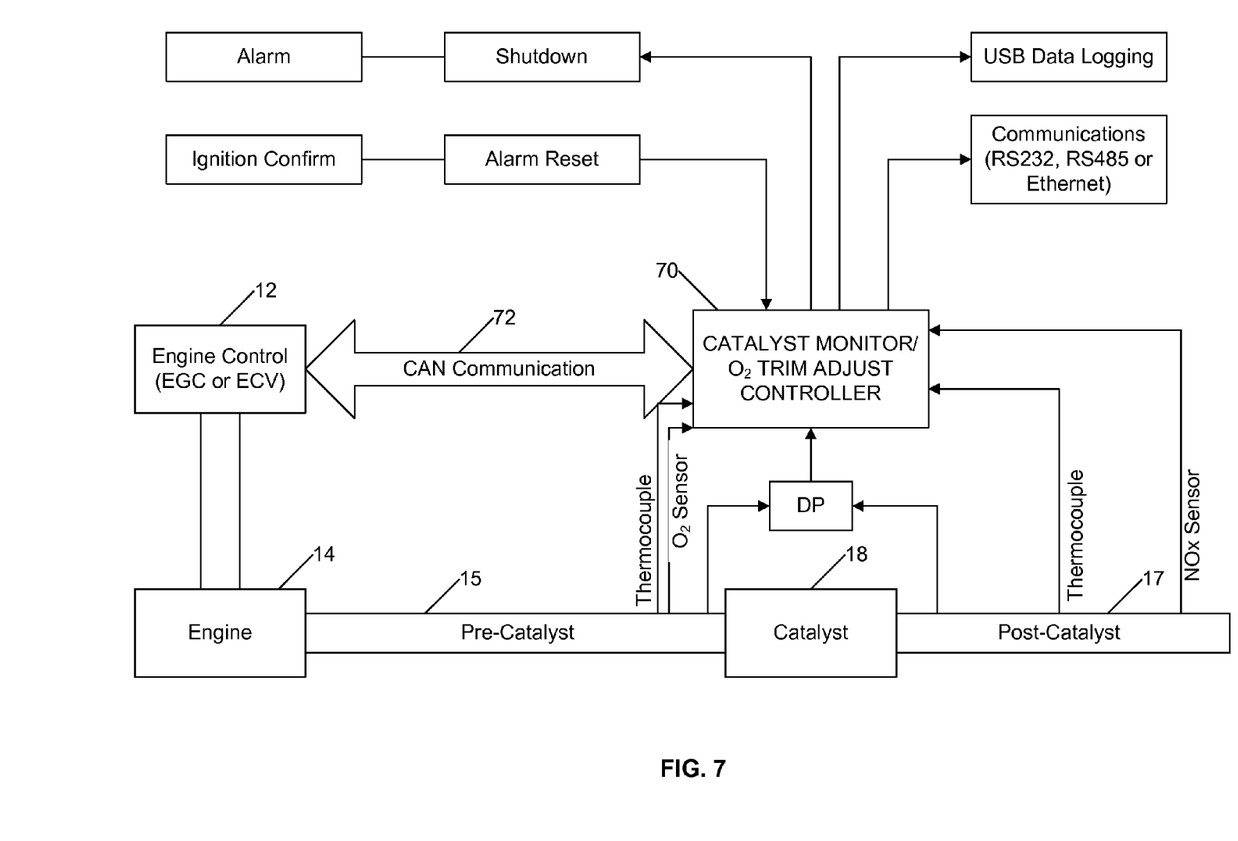
FIG. 7 is a block diagram illustrating an automatic set point adjustment system in combination with a catalyst monitoring system, according to an embodiment.

FIG. 7 illustrates a modified oxygen set point adjustment system in which the automatic set point adjustment system, such as that illustrated in FIGS. 1 to 4, is combined with a catalyst monitor, such as the Catalyst Monitor and Data Logger sold by Continental Controls Corporation of San Diego, Calif. A combined catalyst monitor and oxygen set point or trim adjustment controller or control system 70 communicates with an engine air-fuel ratio controller 12 via CAN communication bus 72. As in the embodiment of FIG. 1, the output of a pre-catalyst oxygen sensor is connected to the air-fuel ratio controller. However, in this embodiment, the connection is via the catalyst monitor/oxygen set point adjustment control system 70 and CAN communication bus 72. As in FIGS. 1, 3, and 4, the output of post-catalyst NOx sensor 16 may be connected to the NOx sensor monitoring input of the oxygen set point adjustment controller for use in determining the next oxygen set point adjustment direction. The other sensor inputs and outputs to controller or control system 70 may be used by the catalyst monitor in determining the status of catalyst 18.

In the above embodiments, a NOx sensor is added after the NSCR catalyst. An oxygen set point adjustment controller or control system monitors NOx sensor outputs over time, and is arranged to modify the oxygen set point of an engine's existing air-fuel controller in order to modify the engine's air-fuel ratio either rich or lean, and thereby adjust the NOx sensor output towards a minimum point corresponding to the ideal control set point for minimum emissions. This allows minimum or close to minimum emissions to be achieved automatically on a continuous ongoing basis without human intervention, thereby compensating for changes in engine conditions and external conditions.

A prototype and exemplary ultra-low emissions system, configured according to certain embodiments discussed herein, will now be described. This prototype system comprises a new catalyst, sized to meet California Air Resources Board's 2007 Distributed Generation (DG) emissions levels, and an AFR control system that consisted of a pair of Continental Control Corporation's Electronic Gas Carburetors (EGCs), model EGC4 (one per bank). The system further comprises a prototype sensor interface and communications unit, and the following sensors:

(1) Gas Injection Pressure Sensor. In the prototype system, this sensor is integral to the EGCs, and forms a primary control method or loop. This primary control method provides fast and aggressive PID control of fuel injection pressure to a venturi mixer. The AFR control system is configured to adjust the pressure set point 370 of FIG. 6 slightly based on bias information from the Universal Exhaust Gas Oxygen (UEGO) Sensor and NOx sensor, described below. The pressure set point 370 is a DC input about which the AFR control system dithers. The dithering utilized was a sine wave with the properties of +/−0.15 AFR at 1 Hz.

(2) Pre-Catalyst UEGO or oxygen Sensor (module 290 of FIG. 6). Control of the pre-catalyst UEGO sensor forms a secondary control method or loop. The AFR control system is configured to utilize the UEGO sensor data to bias the pressure control set point in order to maintain a dynamic pre-catalyst oxygen level set point. In one embodiment, a wide band oxygen sensor, such as a wideband A/F oxygen sensor manufactured by Bosch USA, was used. It was found that a wide band oxygen sensor provided the best stability and least drift.

(3) Post-Catalyst NOx Sensor (module 16 of FIG. 6). The NOx sensor is integral to a tertiary control method or loop. The tertiary control loop initiates periodic AFR sweeps to locate minimum post-catalyst NOx sensor outputs, and then updates the pressure set point as required. The sensitivity of the NOx sensor to both high post-catalyst $NH_3$ (corresponding to overly rich pre-catalyst conditions) and high post-catalyst NOx (corresponding to too lean pre-catalyst conditions) is exploited in the minimization algorithm discussed above (e.g., in relation to FIGS. 2, 4, and 6). Based on this strategy, the relative accuracy and/or absolute value of the NOx sensor is of no concern, as the AFR control system simply attempts to locate the position of the minimum NOx sensor output signal. Previous testing has found that the NOx sensor minimum output signal coincides with the best catalyst conversion efficiency. In one embodiment, a NGK/Continental Smart NOx sensor available from NGK Automotive Ceramics USA, Inc. of Mooresville, N.C. was used in the system due to its consistent and stable output performance.

The prototype system can also utilize monitoring devices for trending, alarms, and shutdown. For example, pre-catalyst and post-catalyst temperature may be monitored, and alarms may be provided for high post-catalyst temperatures and low pre-catalyst temperatures. In addition, the catalyst differential pressure may be monitored, and alarms may be provided for excessive differential pressure and loss of differential pressure. The prototype system may also provide for user-definable alarms—for example, to generate an alert on a condition of non-compliance with one or more air quality thresholds. FIG. 7 is representative of the architecture of the prototype system. In an embodiment, an ultra-low emissions system developed according to the systems and methods disclosed herein, could also include an add-on capability of detecting mechanical troubles, including lean misfire or low-combusting pressure on a cylinder-by-cylinder basis.

The described prototype system was field-tested on a twelve-cylinder vee-type, four-stroke cycle, naturally aspirated, spark-ignited engine fueled by natural gas. However, the prototype system was not engine-make or engine-type specific. The test team identified measurement points on the engine, as well as upstream and downstream of the catalyst. All the data was brought into a custom-configured data acquisition software system. The data acquisition software (DAS) system logged all data at one-second intervals—recording continuous data at one sample per second per channel any time the engine operated—and ensured temporal alignment of all the data. The DAS system also compiled and generated an automatic daily report (e.g., in Microsoft Excel™ format) containing fifteen-minute average data for each hour for NO, $NO_2$, CO, $O_2$, engine kW, and fuel flow. The DAS system also saved each twenty-four hour period's data as one or more files for post-processing and analysis. The data was used to track the response of the oxygen and NOx sensors. In addition, the test team employed a portable emissions analyzer to record weekly measurements of pre-catalyst and post-catalyst emissions to detect trends of pre-catalyst emissions as verification of the readings of the pre-catalyst oxygen sensor, and as a cross-check with a stationary equipment emissions analyzer (SEEA).

To assess the performance of the engine, a test of an engine in the "as found" baseline condition (i.e. without automatic set point adjustment as described above) was conducted, and the same engine was then tested with the prototype set point adjustment system as described in the above embodiments was conducted. This testing consisted of acquiring both pre-catalyst (i.e., engine-out) emissions and post-catalyst emissions. Baseline testing revealed that the baseline engine failed to comply with current South Coast Air Quality Management District (SCAQMD) air permit standards. Furthermore, even in steady-state conditions, under baseline conditions, the engine emissions were unstable as a result of the slow response of the AFR controller to small changes in engine torque and/or speed.

The prototype system was then applied to the engine and tested. Specifically, an AFR controller and catalyst were tested with dithering on pre-catalyst $O_2$ set point and control on pre-catalyst $O_2$ with automatic trimming of pre-catalyst $O_2$ using a post-catalyst NOx sensor. The results of the test were as follows:

| Kilowatt Output (downstream) | Low Load | | | High Load | | |
| --- | --- | --- | --- | --- | --- | --- |
| | Baseline 145 kW | Prototype 197 kW | Reduction (%) | Baseline 245 kW | Prototype 271 kW | Reduction (%) |
| NOx (ppm) | 79.0 | 0.9 | 98.8 | 89.6 | 2.3 | 97.5 |
| CO (ppm) | 3312 | 2.0 | 99.9 | 3865 | 8.5 | 99.8 |
| Total HC (ppm) | 387 | 4.2 | 98.9 | 378 | 3.6 | 99.0 |
| $CO_2$ (%) | 11.1 | 11.9 | −6.8 | 11.0 | 11.9 | −7.5 |
| $O_2$ (%) | 0.05 | 0.00 | 100.0 | 0.05 | 0.00 | 100.0 |
| NOx @ 15% $O_2$ (ppm) | 23.3 | 0.3 | 98.9 | 26.1 | 0.6 | 97.6 |
| CO @ 15% $O_2$ (ppm) | 975 | 1.2 | 99.9 | 1125 | 2.6 | 99.8 |
| HC @ 15% $O_2$ (ppm) | 114 | 1.0 | 99.1 | 109 | 1.0 | 99.1 |

As demonstrated, the prototype system resulted in an average improvement in emission system performance of greater than 99%. NOx and CO emissions of the prototype system were very steady, with NOx typically less than 1 parts per million (ppm) raw and CO between 1.5 ppm and 7.5 ppm raw. Furthermore, the prototype system eliminated the need for operator intervention, such that the AFR controller was completely self-tuning. The prototype system did not require set point mapping or complex maps of manifold pressure versus oxygen sensor voltage, since the system needed only a single set point that is "close enough" to the optimum point, and from that point, auto-tuned itself into the lowest combination of CO and NOx using the feedback signal from the NOx sensor.

The field test confirmed that the prototype system (1) is not engine-make or engine-type specific, (2) does not require individual mapping of each engine, (3) can minimize most of the routine compliance checks and adjustments currently required by commercial systems in the market, (4) improves compliance with current SCAQMD engine regulations defined in its Rule 1110.2, (5) provides practical on-board diagnostics (prognostic) features with alarms to prevent operation in non-compliant conditions, and (6) provides lower NOx, CO, and volatile organic compound (VOC) emissions from reciprocating power and compression system plants and better air quality, while achieving a more robust power grid and the associated lower carbon emissions offered by distributed power generation.

The field test demonstrated at least two unique aspects of the disclosed systems and embodiments. First, the application of dithering provided stable and rapid oxygen storage and release, such that the post-catalyst chemistry caused the output from the NOx sensor to be as stable as possible. This stability was an enabling aspect of the use of the dithering that has not been previously discussed in technical literature. Without dithering, the NOx sensor, operating in a near-stoichiometric environment, may have been of little practical use, since its signal under such conditions is largely random. Thus, the field test proved that dithering provided stable, post-catalyst exhaust chemistry that enabled the NOx sensor to produce a useable output signal. Dithering also enables more effective use of the total catalyst volume, such that, in the case of "additional" volume, it can be used to provide lower emissions levels and better response to transient fueling events.

A second unique aspect of the system, disclosed herein, is the use of an NOx sensor as an indicator of post-catalyst chemistry by exploiting its sensitivity to both NOx (indicative of lean pre-catalyst conditions) and ammonia (indicative of too rich pre-catalyst conditions). By exploiting what researches have identified as a limitation of the use of NOx sensors on stoichiometric engines, the test team enabled a new control technique that does not require calibration of the NOx sensor, or any other type of sensor mapping. Moreover, by bounding the amount of bias that the NOx sensor may exert, the catalyst monitor component of the complete AFR control system can alarm on conditions that lead to a control signal calling for excessively rich or lean operation (e.g., misfire).

Figure 8:
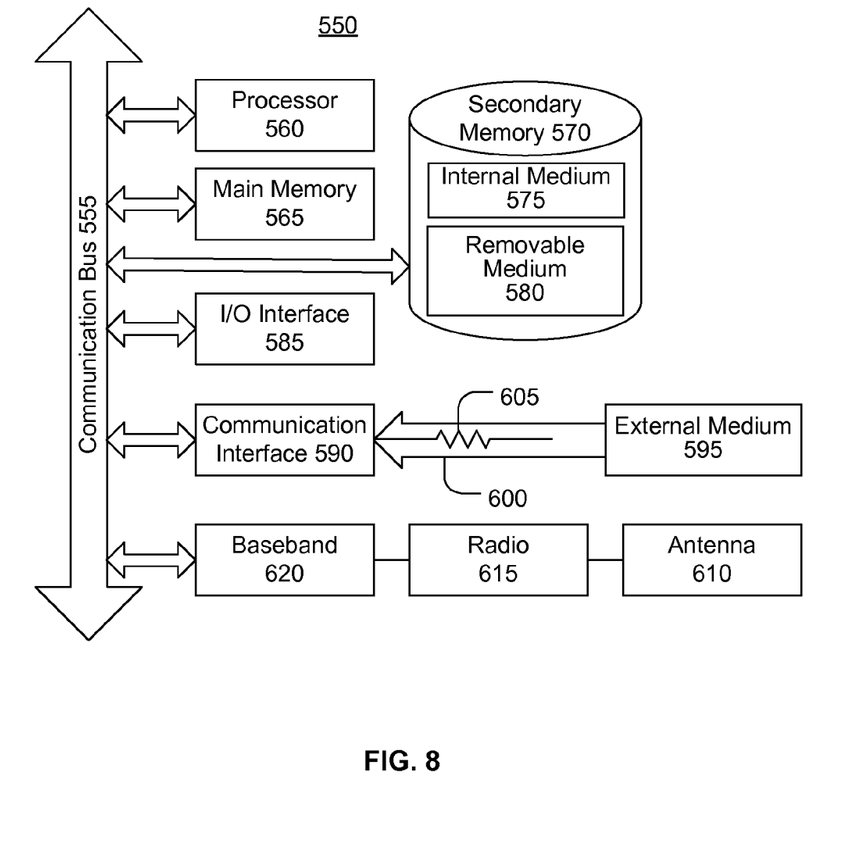
FIG. 8 is a block diagram illustrating an example of a processor-based system that may be used in connection with various embodiments described herein.

FIG. 8 is a block diagram illustrating an example of a computer system 550 that may be used in connection with various embodiments described herein. For example, the computer system 550 may be used as a microprocessor or central processing unit which performs the functions of FIG. 3 and the steps of FIG. 4, and which monitors the output of the NOx sensor and provides the appropriate set point or trim adjustment of the oxygen set point of the air fuel ratio controller. However, other computer systems and/or architectures may be used, as will be clear to those skilled in the art.

The computer system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the computer system 550. The communication bus 555 further may provide a set of signals used for communication with the processor 560, including a data bus, address bus, and control bus (not shown). The communication bus 555 (as well as the CAN buses illustrated in the embodiments of FIGS. 5 and 7, and other communication buses between oxygen set point controller 20 and AFR controller 12) may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 565 and may also include a secondary memory 570. The main memory 565 provides storage of instructions and data in a computer readable medium for programs executing on the processor 560, such as the program illustrated in the flow diagram of FIG. 4 and described above. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include a hard disk drive which has an internal storage medium (hard disk) 575 and/or a removable storage drive for receiving a removable storage medium 580, for example a floppy disk drive, a magnetic tape drive, a compact disc ("CD") drive, a digital versatile disc ("DVD") drive, etc. The removable storage drive reads from and/or writes to removable storage medium 580 in a well-known manner. Removable storage medium 580 may be, for example, a floppy disk, magnetic tape, CD, DVD, etc.

The removable storage medium 580 may be a non-transitory computer readable medium having stored thereon computer executable code (i.e., software) and/or data. The computer software or data stored on the removable storage medium 580 is read into the computer system 550 as electrical communication signals for execution by the processor.

In alternative embodiments, secondary memory 570 may include other similar means for allowing computer programs or other data or instructions to be loaded into the computer system 550. Such means may include, for example, an external storage medium and interface 585. Examples of an external storage medium may include an external hard disk drive or an external optical drive, or an external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units and interfaces, which allow software and data to be transferred from the removable storage unit to the computer system 550.

System 550 may also include a communication interface 590. The communication interface 590 allows software and data to be transferred between system 550 and external devices (e.g., printers, external media storage), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few. Communication interface 590 may also comprise Bluetooth or other wireless communication interface 34 of FIG. 3.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the main memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that were previously described with respect to FIGS. 2 and 3.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

What is claimed is:

1. A system for automatically adjusting a set point of an air-to-fuel ratio (AFR) controller, the system comprising an adjustment controller configured to be communicatively connected to a nitrogen oxides (NOx) sensor and the AFR controller, wherein the adjustment controller comprises:
   at least one hardware processor; and
   one or more modules that
     continuously monitor NOx sensor output from the NOx sensor,
     measure the NOx sensor output at predetermined successive time intervals;
     compare a measure of current NOx sensor output to a measure of prior NOx sensor output, and
     adjust a set point of the AFR controller after each measure of current NOx sensor output by a predetermined step amount in a rich or lean direction based on the comparison, wherein the set point adjustment is in the same direction as a prior adjustment if the measure of the current NOx sensor output is less than the measure of prior NOx sensor output, and the set point adjustment is in the reverse direction from the prior adjustment if the measure of current NOx sensor output is greater than the measure of prior NOx sensor output.

2. The system of claim 1, wherein the one or more modules further calculate an average value of NOx sensor output over a plurality of successive time periods.

3. The system of claim 2, wherein the one or more modules further store an average value of NOx sensor output over at least one prior one of the plurality of successive time periods.

4. The system of claim 3, wherein the measure of current NOx sensor output is an average value of the NOx sensor output over a current time period, and the measure of prior NOx sensor output is an average value of the NOx sensor output over the at least one prior time period.

5. The system of claim 1, wherein the one or more modules adjust the set point in the same direction as the prior adjustment if the measure of the current NOX sensor output is less than or equal to the measure of the prior NOX sensor output.

6. The system of claim 1, wherein the set point is an oxygen sensor set point.

7. The system of claim 6, further comprising the AFR controller, wherein the AFR controller is configured to:
   receive oxygen sensor output from an oxygen sensor positioned in the pre-catalyst exhaust of an engine;
   compare the oxygen sensor output to the oxygen sensor set point; and
   adjust an air-fuel ratio of the engine based on the comparison of the oxygen sensor output to the oxygen sensor set point.

8. The system of claim 1, further comprising the NOx sensor, wherein the NOx sensor is configured to be positioned in the exhaust output of a non-selective engine exhaust catalyst, and generate the NOx sensor output.

9. A method for automatically adjusting a sensor set point of an air-to-fuel ratio (AFR) controller, the method comprising, by at least one hardware processor:
   monitoring NOx sensor output from a nitrogen oxides (NOx) sensor;
   measuring a current NOx sensor output at predetermined time intervals;
   comparing a measure of current NOx sensor output to a measure of prior NOx sensor output; and
   adjusting a set point of an air-fuel ratio (AFR) controller after each measure of current NOx sensor output by a predetermined step amount in a rich or lean direction based on the comparison, wherein the set point adjustment is in the same direction as a prior adjustment if the measure of the current NOx sensor output is less than the measure of prior NOx sensor output, and the set point adjustment is in the reverse direction from a prior adjustment if the measure of current NOx sensor output is greater than the measure of prior NOx sensor output.

10. The method of claim 9, further comprising calculating an average value of NOx sensor output over a plurality of successive time periods.

11. The method of claim 10, further comprising storing an average value of NOx sensor output over at least one prior one of the plurality of successive time periods.

12. The method of claim 11, wherein the measure of current NOx sensor output is an average value of the NOx sensor output over a current time period, and the measure of prior NOx sensor output is an average value of the NOx sensor output over the at least one prior time period.

13. The method of claim 9, further comprising adjusting the set point by the predetermined step amount in the same direction as the prior adjustment if the measure of the current NOx sensor output is less than or equal to the measure of prior NOx sensor output.

14. The method of claim 9, wherein the set point is an oxygen sensor set point.

15. The method of claim 14, further comprising, by the AFR controller:
   receiving oxygen sensor output from an oxygen sensor positioned in the pre-catalyst exhaust of an engine;
   comparing the oxygen sensor output to the oxygen sensor set point; and
   adjusting an air-fuel ratio of the engine based on the comparison of the oxygen sensor output to the oxygen sensor set point.

16. The method of claim 9, wherein the NOx sensor is positioned in the exhaust output of a non-selective engine exhaust catalyst, and wherein the method further comprises, by the NOx sensor, generating the NOx sensor output.

17. A system for automatically adjusting a control set point of an air-fuel ratio controller of an engine, comprising:
   an exhaust catalyst configured for positioning in a pre-catalyst exhaust gas output of an engine and having a post-catalyst exhaust output;
   a nitrous oxides (NOx) sensor located in the post-catalyst exhaust output of the exhaust catalyst and having a NOx sensor output;
   an air-fuel ratio controller configured for controlling the air-fuel ratio input to the engine based on an engine sensor set point; and
   an adjustment controller communicatively connected to the NOx sensor output and the air-fuel ratio controller, the adjustment controller having at least one processor having a trim set point control module configured to trim the engine sensor set point in predetermined increments at predetermined time intervals in order to vary the air-fuel ratio and NOx sensor output, a NOx sensor output monitoring module configured to monitor the NOx sensor output, and a trim direction control module communicatively connected to the NOx sensor output monitoring module and the trim set point control module and configured to reverse the trim direction of the trim set point control module if an increase in the NOx sensor output is detected by the NOx sensor output monitoring module, whereby the NOx sensor output is varied towards a minimum value.

18. The system of claim 17, further comprising an oxygen sensor positioned in the pre-catalyst exhaust output and having an oxygen sensor output, the engine sensor setpoint comprising an oxygen setpoint which is compared to the oxygen sensor output in order to vary the air-fuel ratio input to the engine, and the trim set point module is configured to vary the oxygen setpoint in predetermined increments at predetermined time intervals.

* * * * *